United States Patent Office.

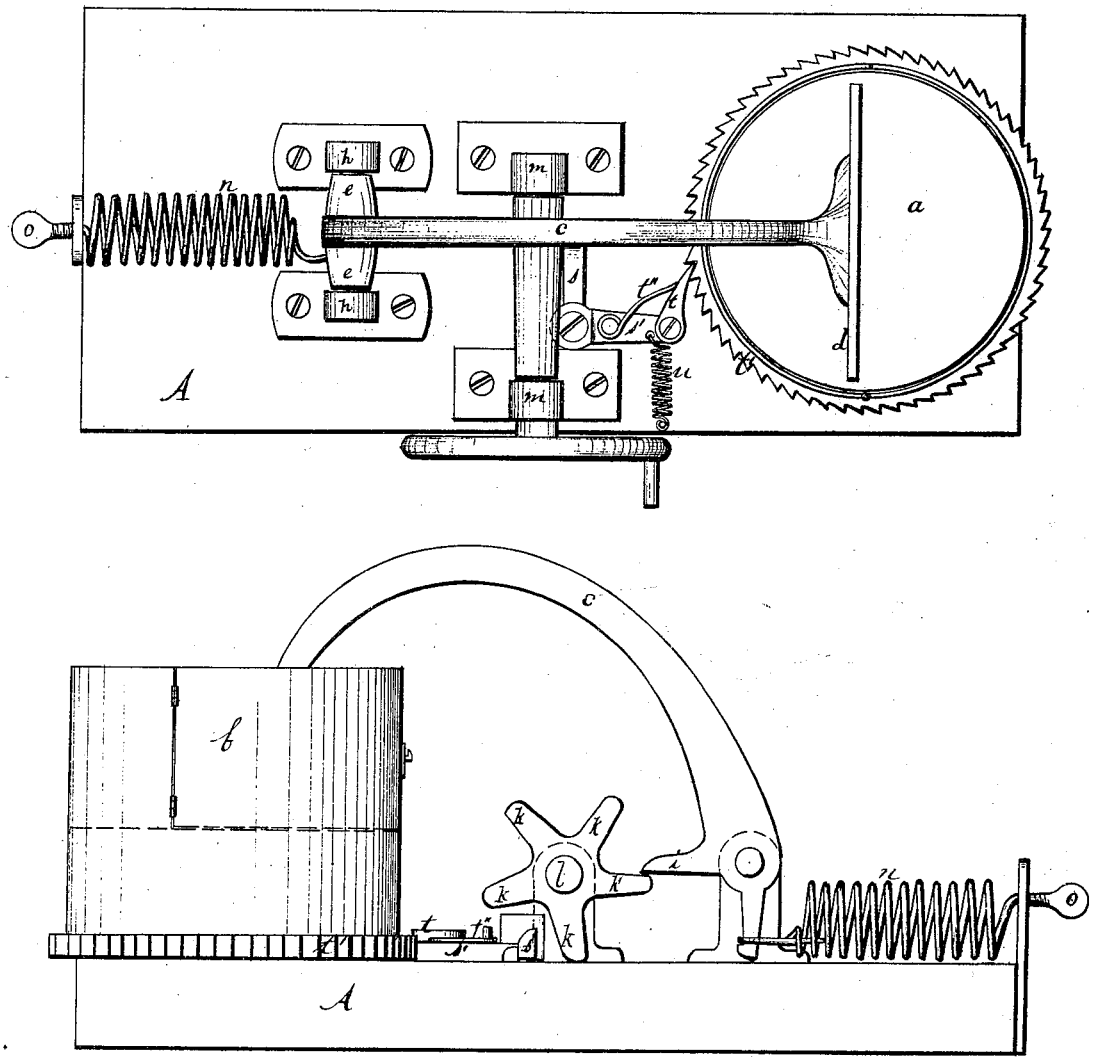

GEORGE H. MELLEN, OF NEW YORK, N. Y.

Letters Patent No. 108,809, dated November 1, 1870.

IMPROVEMENT IN MEAT-CHOPPERS.

The Schedule referred to in these Letters Patent and making part of the same.

I, GEORGE H. MELLEN, of New York, New York county, N. Y., have invented certain Improvements in Meat-Choppers, of which the following is a specification.

In the drawing—

Figure 1 is a plan view, and

Figure 2 a side elevation.

This invention has for its object to cut meat, vegetables, &c., into small pieces, by means of a blade, which, though it alternately rises and falls, yet does not move an invariable distance at each descent, but, if it meets a bone or other hard substance in the course of its downward movement, said blade stops until it is again raised, whereas in those meat-choppers in which the blade moves an invariable distance at every stroke, if it meets with such an obstacle it is either broken or the mechanism severely strained.

The foregoing object is accomplished in my invention by connecting the blade with a spring which is extended when the blade is raised, and which draws the blade downward when the arm that raises the latter is removed from beneath it.

The spring admits of the stopping of the blade on striking an obstacle, whereas, if the blade were operated by a crank or other device having a positive motion, it could not stop, without injuring the apparatus, until the movement of the crank was finished, while if the positive motion of the device continued, an equal or greater injury would result.

Referring to the drawing—

A is the base-board of the apparatus.

$a$, a cylindrical wooden block set on end upon the base A, and pivoted thereto, so as to be rotatory.

$b$ is a flange extending upward from the block $a$, so as to form a vessel for holding meat, vegetables, &c.

$c$ is a curved bar, bearing, at one extremity, a horizontal blade, $d$, or blades, that sit transversely of the vessel $b$, and having, at its other extremity, trunnions $e$ $e$, by which the said bar is mounted in vertical standards $h$ $h$, that are secured to the base A.

$i$ is an arm that projects forward from the rear end of the curved bar $c$.

$k$ is a spur-wheel placed vertically on a shaft, $l$, that is mounted horizontally in the uprights $m$ $m$, which spring from the base A in front of the arm $i$, and so near the same that the spurs of the wheel $k$, one after another, strike the lower side of the arm $i$ as the shaft $l$ is revolved by hand or other power, and raise said arm, together with the bars $c$ and blade $d$, until the spur clears the arm $i$, in the ends of which spurs friction-rollers may be inserted.

$n$ is a spring, here shown as spiral, but capable of being made of any other shape, or of any suitable material, and connected at one end with a prong that projects downward from the extremity of the bar $c$, and at the other end with the extremity of a screw $o$, that passes horizontally through a standard, $r$.

The spring $m$ is extended when the bar $c$ is raised as aforesaid, and draws said bar and its blade downward as soon as the spur $k$ passes the arm $i$.

It is this downward motion of the bar and blade that causes the latter to cut the meat.

The spring $m$ admits of the stopping of the blade on meeting with a hard substance.

The tension of the spring $n$ may be regulated by turning the screw $o$, so as to cause the spring to exert more or less force on the bar $c$.

An elbow-lever, pivoted horizontally to the base A, extends one of its arms $s$ into the path of the spurs $k$, and to the extremity of its other arm $s'$, a pawl, $t$, is pivoted, which pawl engages with the annular ratchet $t'$ that is secured to the outside of the block $a$.

A spring, $t''$, tends to keep the pawl always pressed into the ratchet.

As the wheel $k$ revolves, the spurs one after another strike the arm $s$ of the elbow-lever and draw it backward. This movement of the lever causes the pawl $t$ to turn the ratchet $t'$ and block $a$ far enough between the strokes of the blade $d$ to shift the position of the contents of the vessel $b$ to the required extent.

A spring, $u$, retracts the elbow-lever after every movement imparted to it by the spurs.

To the under side of the arm $i$ a steel slotted plate is secured by a set-screw, which plate may be moved outward to the end of the arm $i$, when the same becomes so worn by the friction of the spurs $k$ as to be partially inoperative.

The vessel $b$ is provided at one side with a hinged door of such dimensions that when swung open it exposes an orifice in the vessel $b$ large enough to admit of the ready removal of the contents of the same.

I claim as my invention—

1. The arrangement of the adjustable spring $n$, screw $o$, bar $c$, and blade $d$, as specified.

2. The arrangement of the block $a$, ratchet $t'$, pawl $t$, elbow-lever $s$ $s'$, springs $u$ $t''$, and spur-wheel $k$, as described.

3. The arrangement of the bar $c$, arm $i$, spur-wheel $k$, and adjustable spring $n$ and screw $o$, as set forth.

4. The arrangement of the block $a$, vessel $b$, blade $d$, bar $c$, spur-wheel $k$, spring $n$, elbow-lever $s$ $s'$, pawl $t$, and ratchet $t'$, as explained.

GEO. H. MELLEN.

Witnesses:
GEO. E. BROWN,
C. O. BROWN.